United States Patent
Tomlinson, III et al.

[11] Patent Number: 5,847,831
[45] Date of Patent: Dec. 8, 1998

[54] APPARATUS FOR MONITORING THE STATE OF A LIQUID-CRYSTAL POLARIZATION

[75] Inventors: W. John Tomlinson, III, Holmdel; Richard E. Wagner, Fair Haven, both of N.J.

[73] Assignee: Bell Communcations Research, Inc., Morristown, N.J.

[21] Appl. No.: 654,979

[22] Filed: May 29, 1996

[51] Int. Cl.$^6$ .................................................. G01J 4/00
[52] U.S. Cl. ......................... 356/364; 356/366; 356/367; 356/368
[58] Field of Search ................................. 356/364, 365, 356/345; 359/39, 94, 97, 122–124, 127, 128, 130, 131, 139, 245, 246, 494, 496, 615; 385/17, 37, 20

[56] References Cited

U.S. PATENT DOCUMENTS

| | | | |
|---|---|---|---|
| 5,414,540 | 5/1995 | Patel et al. | 359/39 |
| 5,414,541 | 5/1995 | Patel et al. | 359/39 |

OTHER PUBLICATIONS

Patel et al., "Liquid Crystal and Grating-Based Multiple-Wavelength Cross-Connect Switch", IEEE Photonics Technology Letters, vol. 7, No. 5, pp. 514–516, May 1995.

*Primary Examiner*—Frank G. Font
*Assistant Examiner*—Michael P. Stafira
*Attorney, Agent, or Firm*—James W. Falk; Joseph Giordano

[57] ABSTRACT

A liquid crystal (LC) polarization modulator segment (216, 218) includes a monitoring device (220). The monitoring device (220) includes a polarized reference light source (222), located at an LC polarization monitor input, and polarized light detector (224), located at an LC polarization monitor output. If the reference light having the correct polarization is received at the detector (224), an indication of the switch state is provided. Alternatively, if the polarized detector (224) includes orthogonal polarizers (230A, 230B) provided for two separate light detectors (232A, 232B) both the desired polarization, and the opposite polarization, may be monitored to determine whether a failure exists in the segment. If the reference light is detected having the opposite polarization (instead of or in addition to the correct polarization) or no light is detected, the segment (or the monitor) is not operating correctly.

6 Claims, 3 Drawing Sheets

APPARATUS FOR MONITORING THE STATE OF A LIQUID-CRYSTAL POLARIZATION

BACKGROUND OF THE INVENTION

1. Field of the Invention

The present invention relates to multiwavelength optical network switching and, more particularly, to a apparatus for monitoring the state of a liquid-crystal polarization modulator, such as may be used in an optical switch.

2. Description of Related Art

Telecommunications and other networks, such as intra-computer interconnects, are increasingly relying on optical fibers for high-speed, noise-free data channels. Such optical networks have previously suffered from an inability to switch an input signal between two or more output channels without converting the optical signal into an electrical signal in order to use conventional electrical switching devices and techniques. These conversions require substantial amounts of electronic equipment, which increases the cost of the network.

Several devices and techniques for switching optical signals without converting the optical signal into an electrical signal have been proposed. Some of these devices include integrated optical devices such as optical couplers, nonlinear optics, and acousto-optical converters. All of these devices are incapable of providing the required level of crosstalk rejection in a single switch stage, or the required usable channel bandwidth for practical application.

The development of liquid crystal optical switching devices provided the required crosstalk rejection and bandwidth not previously possible. One such device is described in Patel et al., "Liquid Crystal and Grating-Based Multiple-Wavelength Cross-Connect Switch," IEEE Photonics Technology Letters, Vol. 7, No. 5, pp. 514–516 (May 1995), and in U.S. Pat. No. 5,414,540 entitled "Frequency-Selective Optical Switch Employing a Frequency Dispersive Element, Polarization Dispersive Element and Polarization Modulating Elements," ("the '540 patent") to Patel et al. and assigned to the assignee herein. A second such device is disclosed in U.S. Pat. No. 5,414,541, entitled "Optical Switch Employing First and Second Ferroelectric Cells With Alignment Layers Having Alignment Directions Offset by 45°" ("the '541 patent") to Patel et al. and also assigned to the assignee herein. The contents of these three documents are incorporated herein by reference.

Brief descriptions of the operation of illustrative embodiments of the optical switch described in the '540 patent are provided for background.

FIG. 1A is an isometric view of a 1×2 optical switch 10 according to one embodiment of the '540 patent. In this illustration, the optical switching element 12 has a single optical input 14 and two optical outputs 16, 18. Note that the two outputs are offset from the input in the y direction. The reasons for this will be made apparent below. These optical inputs and outputs may be single-mode optical fibers having collimating graded-index lenses. FIG. 1B is a top view of the optical switch 10 of FIG. 1A. The switch 10 illustrated in FIGS. 1A and 1B may route an optical signal from the input 14 to either the first or second outputs in order to route the optical signal to a desired location. (It may be possible to route the signal to both outputs, as well.) This is done without any mechanically moving parts and without converting the optical signal into an electronic signal.

The structure and operation of an exemplary optical switch according to the '540 patent are described with reference to FIGS. 2A and 2B.

FIG. 2A is a top view of an optical switch 100 according to one embodiment of the '540 patent. This optical switch 100 includes an input frequency dispersive medium 102, such as a diffraction grating or prism, an entrance lens 104, a first polarization dispersive element 106, such as a calcite crystal, a segmented liquid-crystal (LC) polarization modulator 108, a second polarization dispersive element 110, an exit lens 112, and an output frequency dispersive medium 114. The segmented LC polarization modulator 108 has two segments 116, 118. Each segment 116, 118 is connected to a switch, 117, 119, respectively. Each switch connects the respective segment to either a voltage supply or ground.

The optical switch 100 of FIG. 2A operates as follows. One or more multiwavelength optical signals 120, such as Wavelength Division Multiplex signals, are input into the optical switch. Each multiwavelength input signal may carry a number of optical signals multiplexed together at different frequencies. The input signal 120 is directed to the first frequency dispersive medium 102. The frequency dispersive medium 102 separates the multiple wavelength signal 120 into several single frequency signals. For simplicity, FIG. 2A illustrates a single input signal 120 which is separated into two single frequency optical signals 122, 124.

The separated single frequency optical signals 122, 124 are now separated from each other in the x direction. These signals are directed to the entrance lens 104. The entrance lens focuses each signal 122, 124 onto a different location of the LC polarization modulator 108. However, the signals first pass through the first polarization dispersive element 106. This element disperses in the y direction optical signals having a certain polarization (y, for example). Thus, if the input signal has an x polarization, the frequencies are separated out in the x direction by the frequency dispersive element 102, and exit the first polarization dispersive element 106 without any displacement in the y direction. If the input signal has a y polarization, the frequencies are separated out in the x direction by the frequency dispositive element 102 and are displaced in the y direction by the first polarization dispersive element 102.

The optical signals exit the first polarization dispersive element 106 and enter one of the segments 116, 118 of the LC polarization modulator 108. These segments include crystals which ordinarily rotate 90° the polarization of a light beam passing through it. These crystals, however, when biased with a voltage, arrange themselves so that light beams pass through without a polarization change. In this illustrative embodiment, the segments are arranged side-by-side in the x direction. Each of the segments may be independently biased to rotate or to not rotate the optical signal polarization 90° by connecting the segment to ground potential or voltage source. Thus, whether or not a signal passing through one of the segments 116, 118 has its polarity rotated depends on whether or not that segment is connected to a voltage source or to ground.

After passing through the LC polarization modulator 108, the optical signals pass through the second polarization dispersive element 110. This element 110 displaces in the y direction optical signals having a certain polarization (y, for example). Thus, if an optical signal received from the LC polarization modulator has an x polarization, it passes through the element 110 without being displaced.

The optical signals pass through the exit lens 112. The exit lens focuses the various optical signals onto the exit frequency dispersive medium 114, such as a diffraction grating or prism. Optical signals on the same y plane are then combined in the same manner that they were separated.

However, the different frequency signals may be displaced in the y direction. It is this y displacement that directs the optical signals to the desired output optical fiber. As described in the '540 patent, by adding additional polarizing optical elements and an additional input fiber, this switch can provide a full 2×2, polarization-independent switch functionality.

Consider the following example illustrated in FIG. 2B, which is an isometric view of a portion of an input beam 120' consisting of two multiplexed signals each having an x polarization. A multiwavelength input signal 120' is input into the optical switching element 100. The beam 120' is directed to the diffraction grating 102. The diffraction grating separates the input beam 120' into two beams 122', 124' having different frequencies. These beams 122', 124' are separated in the x direction, but located on the same y plane. The two beams 122', 124' pass through the entrance lens 104. The entrance lens focuses each beam onto a different location on the LC polarization modulator 104 through the first polarization dispersive element 106. Because the signals 122', 124' each have an x polarization, neither signal is displaced in the y direction.

The two signals, separated in the x direction, are focused onto separate segments 116, 118 of the LC polarization modulator 108. These segments may be separately controlled to direct beams to a desired location. In FIG. 2B, segment 116 is connected to ground, and segment 118 is connected to a voltage supply. This means that signal 122' passes through the segment 116 and is rotated 90° to have a y polarization. The signal 124' passes through the segment 118 and is not rotated.

The two signals exit the LC polarization modulator 108 and are directed to the second polarization dispersive element 110. The signal 122' has a y polarization after exiting the grounded segment 116. This means that the signal is displaced in the y direction by the second polarization dispersive element 110. The beams 122', 124' exit the second polarization dispersive element 110 separated in the y direction. The beams then pass through the exit lens 112. The exit lens focuses the signals onto the exit frequency dispersive medium 114. The exit frequency dispersive medium re-multiplexes signals having the same y value, but different x values. Here, the two signals have different y values, and the exit frequency dispersive medium focuses the two beams onto different exit optical fibers.

The '541 patent also discloses an optical switch using an LC polarization modulator. In a preferred embodiment of the '540 and '541 patents, the LC polarization modulator is a twisted nematic LC modulator, but other types of LC polarization modulators are possible, such as a twisted smectic structure.

A critical issue for managing multiwavelength optical networks is obtaining reliable confirmation of the actual states of the optical switches in the network. An optical switch may handle more than one optical signal having the same wavelength. For example, two input beams may each have an optical signal multiplexed to the same frequency. Therefore, a spectral monitor which identifies different optical wavelengths cannot verify that the signals (having the same wavelength) are being properly switched. Prior art switches having mechanically moving parts, such as prisms, may use mechanical closures to confirm the location of the moving part. This approach cannot be used in optical switching elements such as those described above.

Therefore, it is an object of the present invention to provide a method and an apparatus for confirming the state of an optical switch that uses rotation of light polarization to switch the optical signal.

It is a further object of the present invention to provide a method and apparatus for detecting the state of a LC polarization modulator segment, such as a twisted nematic LC polarization modulator segment.

SUMMARY OF THE INVENTION

These and other objects of the present invention are provided by an LC polarization modulator monitoring device. The monitoring device directs a polarized reference light source through a LC polarization modulator segment and a polarized light detector detects if the reference light exiting the LC polarization monitor has a desired polarization. An indication of the segment switching state is provided if the reference light having the desired polarization is detected or not detected.

Alternatively, if two polarized light detectors, sensitive to orthogonal polarizations, are provided, it is possible to obtain further information on the state of the polarization modulator segment, and on the condition of the monitor device. If the reference light having the desired polarization is detected, and reference light with the orthogonal polarization is not detected, this indicates that the segment and the monitor are operating correctly. If reference light with the orthogonal polarization, or with both polarizations, is detected, this indicates that the segment is not functioning properly. If reference light is not detected at either polarization, this indicates that the segment and/or the monitor have failed.

A preferred embodiment of the present invention comprises the following. The polarized reference light source preferably includes a reference light source and a reference light polarizer. The polarized light detector preferably includes a detector polarizer and a detector. The polarized reference light source is preferably configured to emit light in the same general spectral region as an input beam wavelength. The light emitted by the light source is used as a reference beam. The reference beam is preferably polarized by the reference light polarizer to have the same polarization as the input beam. The polarized reference beam passes through the LC polarization modulator segment in the same direction and general region as the input beam. The reference beam exits the modulator and is directed to the detector polarizer. The detector polarizer only passes light having the desired polarization. If the light passes through the detector polarizer, it is received by the detector. This indicates that the light having the desired polarization is exiting the modulator. If no light is received by the detector, this indicates that no light having the desired polarization is exiting the modulator. Thus, the monitor provides an indication of the switching state.

Alternatively, if a second detector polarizer and a second detector are provided, a greater level of information may be provided. The second detector polarizer only passes light having the opposite polarity to the one desired. If light passes through the second polarizer, it is received by the second monitor. If the reference beam is detected only at the detector having the desired polarization (and no others), the proper operation of the switch is confirmed. If the reference beam is detected at the detectors receiving light having the opposite polarization, or if neither detector receives the reference beam, a switch or monitor failure is indicated.

BRIEF DESCRIPTION OF THE DRAWINGS

The present invention is described with reference to the following drawings.

DETAILED DESCRIPTION OF A PREFERRED EMBODIMENT

Figure 1A:
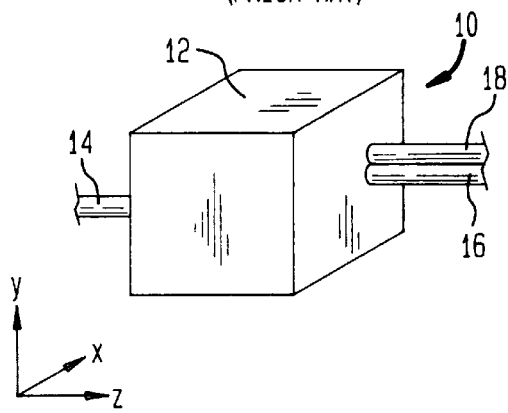
FIG. 1A is an isometric view of a first prior art liquid crystal optical switching element with which the present invention may be used.
Figure 1B:
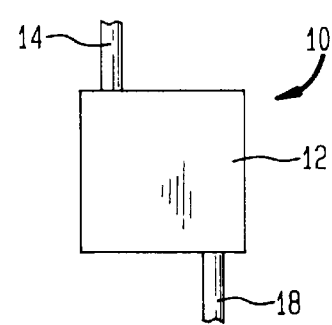
FIG. 1B is a top view of the optical switching element of FIG. 1A.
Figure 2A:
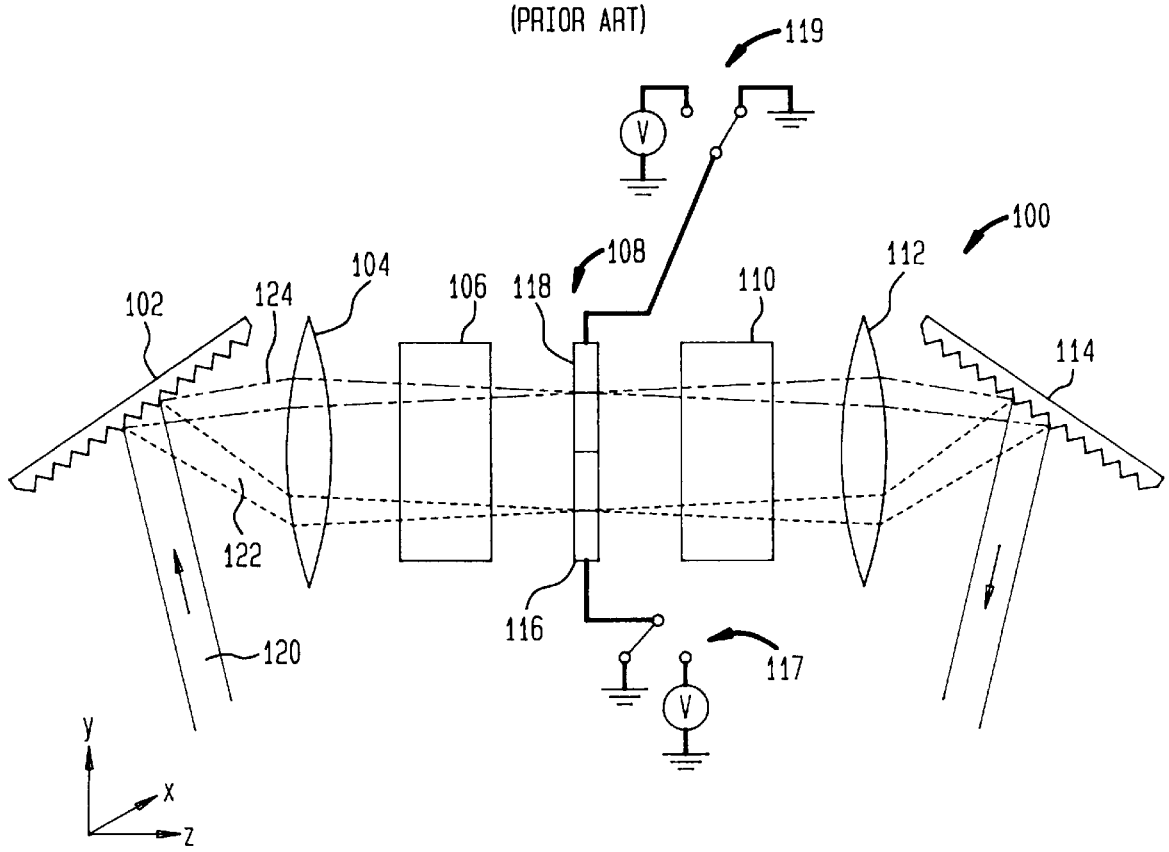
FIGS. 2A and 2B are isometric views of a prior art liquid crystal optical switching element with which the present invention may be used.
Figure 2B:
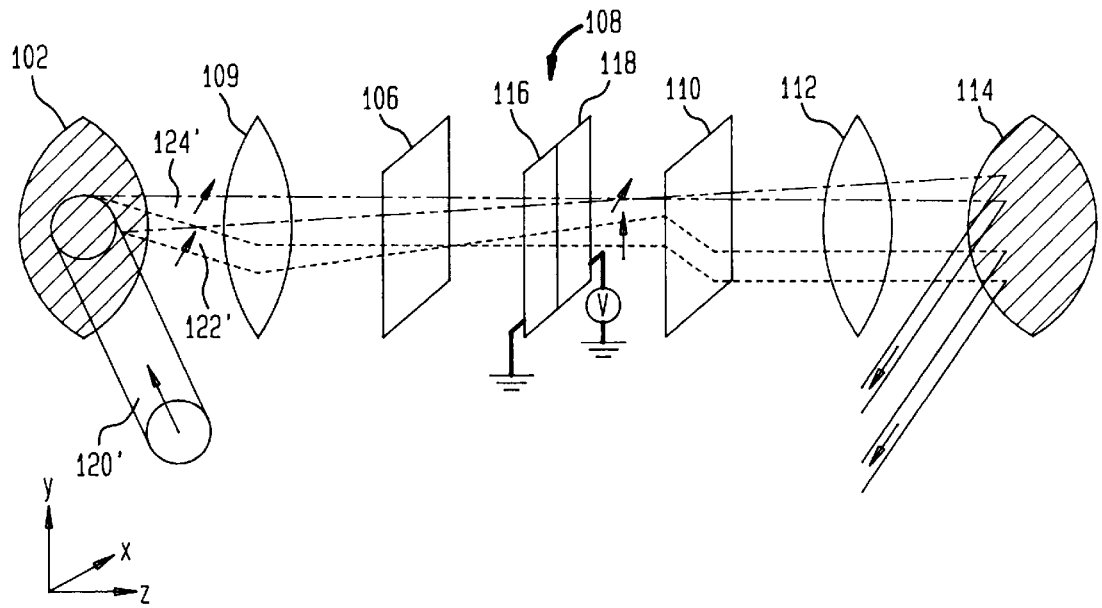
Figure 3:
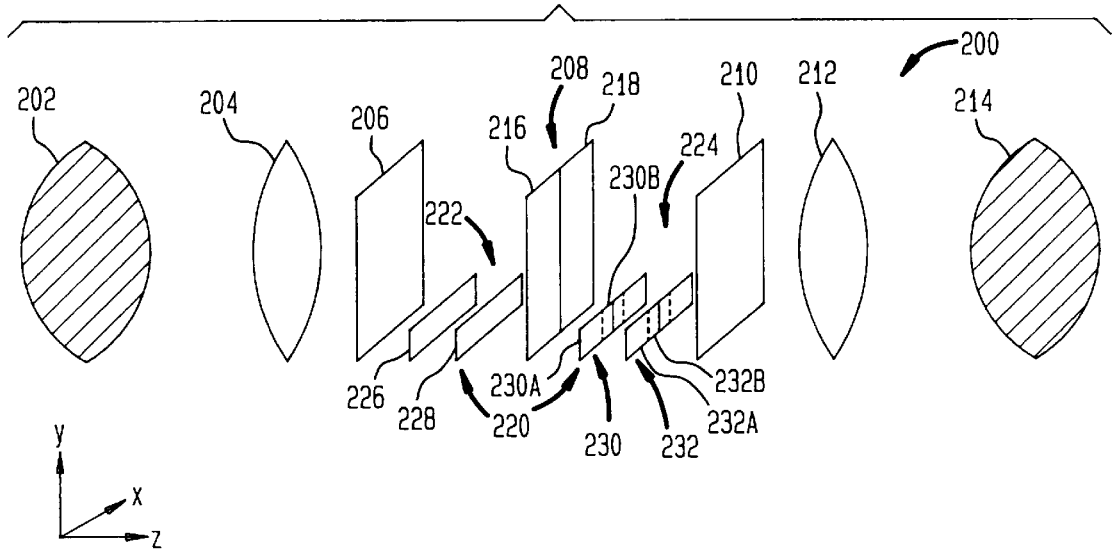
FIG. 3 is an isometric view of a liquid crystal optical switching element having a state confirmation device according to an embodiment of the present invention.

FIG. 3 illustrates a first preferred optical switching element 200 having a state confirmation device according to the present invention.

The switching element 200 is similar to the switching element described in the '540 patent and includes an input frequency dispersive medium 202, an entrance lens 204, a first polarization dispersive element 206, a segmented LC polarization modulator 208, a second polarization dispersive element 210, an exit lens 212, and output frequency dispersive medium 214, LC polarization modulator segments 216, 218, and a monitoring device 220.

The monitoring device 220 comprises several components. A polarized reference light source 222 is located on an input side of the LC polarization modulator segments. A polarized light detector 224 is located on an output side of the LC polarization modulator segments.

The polarized reference light source 222 includes a reference light source 226 and a reference light polarizer 228. The polarized light detector 224 includes an exit light polarizer 230 and a light detector 232. In a preferred embodiment, for each segment 216, 218, each polarized light detector 224 includes two exit light polarizers 230A, 230B, which polarize light in orthogonal directions (e.g. x, y): and two light detectors 232A, 232B.

Figure 4A:
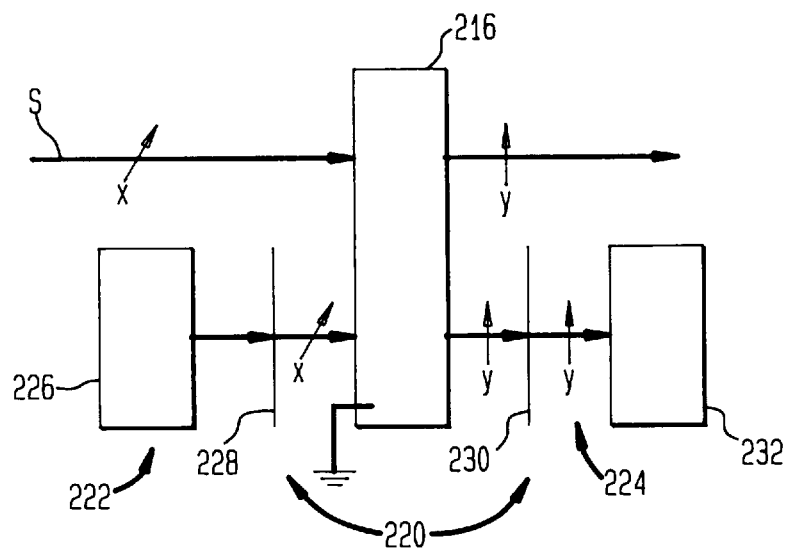
FIG. 4A is a side view of a state confirmation device according an embodiment of the present invention in place in an optical switch.

This device operates as follows: with reference to FIG. 4A which is a side view of an LC polarization modulator segment 216 and the monitoring device 220 of FIG. 3. The input signal beam S passes through the segment 216 above the monitoring device 220.

The reference light source 226 provides light in the same general spectral region as the input signal beams S. This light need not be coherent and is preferably a light-emitting diode (LED). A single reference light source 226 may be used for both segments. Alternatively, a separate reference light source may be used for each segment. Preferably, a first or reference light polarizer 228 polarizes the light to have the same polarization as the incoming signal beam S. Assume the reference light polarizer 228 polarizes the light to an x polarization. The polarized reference light passes through the segment 216 which, in this illustration, is connected to ground and thus rotates 90° the light polarization. The reference light exits the segment 216 having a y polarization.

The light then passes through the a second or exit light polarizer 230, which only passes light having a particular polarization. Assume the exit light polarizer 230 passes light having a y polarization. In this illustration, the y polarized light passes through the exit light polarizer 230 and is detected by the light detector 232. This detector may be any conventional photodetector. The detector generates a signal indicating that the y polarized light has been received. If the light exiting the segment only has an x polarity, no light will pass the detector input light polarizer 228 and no light will reach the detector 232.

Using this single input/single detector arrangement, the detector will receive a signal for one switch state, but not for the other. If the light exiting the segment has a y polarity—in this illustration indicating that the element is properly biased—the light will be received by the detector 250. This single polarity reference light polarizer/single polarity exit light polarizer provides some indication as to the operation of the segment. The chart below sets out the polarization arrangements and expected detections for grounded and voltage biased segments:

| Input Polarizer | Segment Bias | Exit Light Polarizer | Detection Expected |
| --- | --- | --- | --- |
| X | Ground | X | No |
| Y | Ground | X | Yes |
| X | Ground | Y | Yes |
| Y | Ground | Y | No |
| X | Voltage | X | Yes |
| Y | Voltage | X | No |
| X | Voltage | Y | No |
| Y | Voltage | Y | Yes |

Figure 4B:
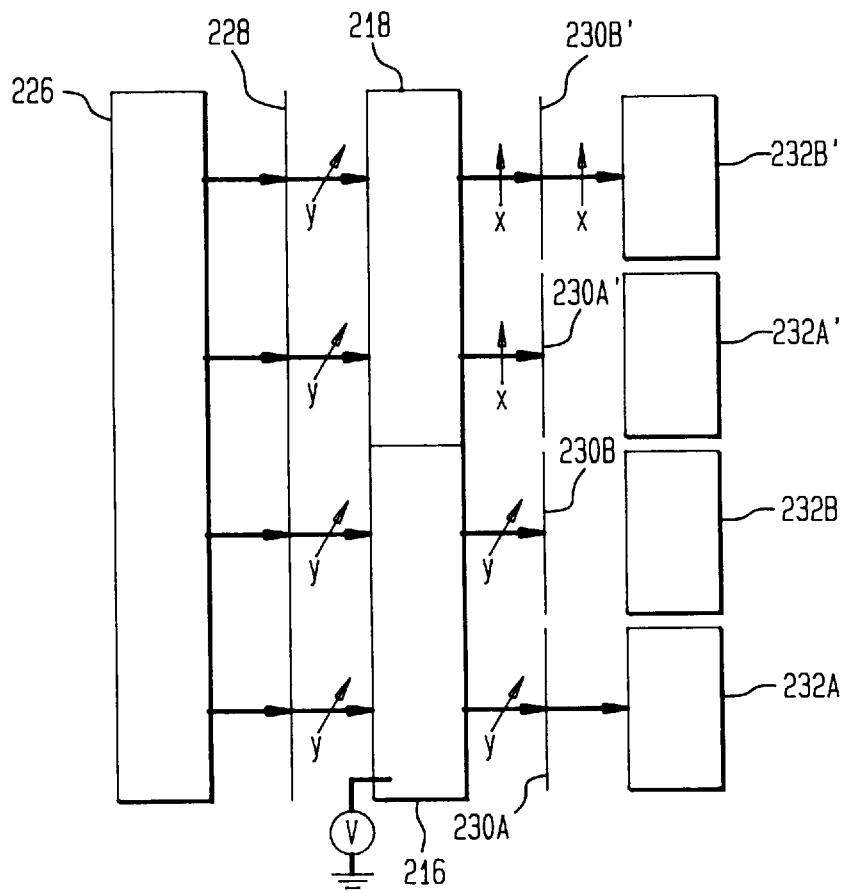
FIG. 4B is a top view of the state confirmation device of FIG. 4A.

This arrangement does not provide a complete indication of the segment operation. For example, certain errors may not be detected, such as if light having both polarizations or if no light exits the segment. In a preferred embodiment, therefore, as seen in FIG. 4B, two detector polarizers 230A, 230B are provided for each segment; one which passes light polarized in the x direction, and one which passes light polarized in the y direction. Detectors 232A, 232B receive light passing through the polarizers 230A, 230B. As seen in FIG. 4B, light emitted from the light source 226 is polarized by the first or reference light polarizer 228 to a y polarity. This y polarized light passes through both LC polarization modulator segments 216, 218. Segment 216 is connected to a voltage supply and the light passes through unrotated. The y polarized light passes through exit light polarizer 230A (which passes y polarized light) and is detected by detector 232A. The y polarized light does not pass through a third or exit light polarizer 230B (which passes x polarized light), and no light is detected by detector 232B. Segment 218 is connected to ground and the light passes thorough rotated 90°. The light polarized light does not pass through exit light polarizer 230A' (which passes y polarized light) and no light is detected by detector 232A'. The x polarized x passes through exit polarizer 230B' (which passes x polarized light) and the light is detected by detector 232B'. If the reference light having the desired polarization is detected, and reference light with the orthogonal polarization is not detected, this indicates that the segment and the monitor are operating correctly. If reference light with the orthogonal polarization, or with both polarizations, is detected, this indicates that the segment is not functioning properly. If reference light is not detected at either polarization, this indicates that the segment and/or the monitor have failed.

If the optical switch is manufactured as a single unit the components may be affixed to each other using an epoxy, such as an ultraviolet light curable epoxy. If the optical switch is manufactured as a number of separate components, the components should have anti-reflective coatings. Because the monitor samples the state of the LC cell in an area close to where the signal beams pass through the cell, they do not monitor the actual area used by the signal beam(s). To provide additional ability to detect cell failures that do not extend over the entire cell area, it is obvious that additional monitor units could be added to monitor the cell at additional points around the area used by the signal beam(s).

The above described embodiments of the invention are intended to be illustrative only. Numerous alternative embodiments may be devised by those skilled in the art without departing from the spirit and scope of the following claims. For example, a person skilled in the art recognizes that this invention may be used to monitor any device which rotates the polarity of light.

We claim:

1. An optical switch having a liquid crystal (LC) polarization modulator to direct optical signals, the improvement comprising:

a polarized reference light source located on a first side of the LC polarization modulator, said polarized reference light source including a source of light in the same general spectral region as a light beam to be input to the LC polarization modulator and a first polarizer configured to polarize light to a predetermined polarization;

a first polarized light detector located on a second side of the LC polarization modulator, opposite the first side, and configured to detect light having a desired polarization, said first polarized light detector comprising a second polarizer configured to receive the polarized reference light after passing through the LC polarization modulator and to pass only light having the desired polarization and a detector located to receive light passing through the second polarizer; and a second polarized light detector located on the second side of the LC polarization modulator and configured to detect light having a polarization opposite the desired polarization, wherein the second polarized light detector comprises a third polarizer configured to receive the polarized reference light after passing through the LC polarization modulator and to pass only light having the polarization opposite the desired polarization and a detector configured to receive light passing through the third polarizer.

2. The optical switch of claim 1 wherein the first polarizer is configured to polarize light to a same polarization as the light beam to be input into the LC polarization modulator.

3. An optical switch comprising:

a source of frequency separated optical input signals, a liquid crystal polarization modulator, a first polarization dispersive element between said source of frequency separated optical input signals and said liquid crystal polarization modulator, a second polarization dispersive element to the other side of said liquid crystal polarization modulator than said first polarization dispersive element, and means for confirming the state of the optical switch, said means comprising:
      a light source distinct from said source of frequency separated optical signals and located to the same side of said liquid crystal polarization modulator as said source of frequency separated optical signals,
      a first polarizer configured to polarize light in a predetermined polarization and between said light source and said liquid crystal polarization modulator,
      a second polarizer configured to receive the polarized light from said first polarizer after passing through said liquid crystal polarization modulator and to pass only light having the desired polarization, and
      a detector located to receive light passing through said second polarizer.

4. The optical switch in accordance with claim 3 wherein said light source provides light in a same general spectral region as the light from said source of frequency separated optical signals.

5. The optical switch in accordance with claim 4 wherein said liquid crystal polarization modulator is segmented.

6. The optical switch in accordance with claim 5 wherein said second polarizer receives light through only one of the segments of said liquid crystal polarization modulator and further comprising a third polarizer configured to receive light from said first polarizer after passing through a second of the segments of said liquid crystal polarization modulator and a further detector located to receive light passing through said third polarizer.

* * * * *